(12) United States Patent  
Nagahisa

(10) Patent No.: US 8,152,363 B2  
(45) Date of Patent: Apr. 10, 2012

(54) TEMPERATURE DETECTION CIRCUIT

(75) Inventor: Takeshi Nagahisa, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 883 days.

(21) Appl. No.: 12/166,171

(22) Filed: Jul. 1, 2008

(65) Prior Publication Data

US 2009/0010301 A1     Jan. 8, 2009

(30) Foreign Application Priority Data

Jul. 2, 2007    (JP) .................................. 2007-174019

(51) Int. Cl.  
     *G01K 15/00*      (2006.01)

(52) U.S. Cl. .............................. 374/1; 374/170; 374/178

(58) Field of Classification Search ............... 374/1, 170, 374/178  
See application file for complete search history.

(56) References Cited

U.S. PATENT DOCUMENTS

| | | | | |
|---|---|---|---|---|
| 3,953,807 A | * | 4/1976 | Schade, Jr. .................... 330/277 |
| 4,352,053 A | * | 9/1982 | Oguchi et al. ................. 323/220 |
| 4,441,826 A | * | 4/1984 | Morokawa et al. ........... 368/204 |
| 4,596,958 A | * | 6/1986 | Graeme et al. ................ 330/253 |
| 5,017,854 A | * | 5/1991 | Gully et al. .................... 318/811 |
| 5,279,162 A | * | 1/1994 | Takebe et al. ................. 374/143 |
| 5,422,563 A | * | 6/1995 | Pflueger ........................ 323/312 |
| 5,488,288 A | * | 1/1996 | Elmer ............................ 323/284 |
| 5,659,516 A | * | 8/1997 | Casagrande et al. .......... 365/226 |
| 5,798,961 A | * | 8/1998 | Heyden et al. .................. 365/52 |
| 5,905,677 A | * | 5/1999 | Casagrande et al. ..... 365/185.23 |
| 5,910,726 A | * | 6/1999 | Koifman et al. .............. 323/315 |
| 6,037,807 A | * | 3/2000 | Wu et al. ......................... 327/52 |
| 6,158,887 A | * | 12/2000 | Simpson ........................ 374/183 |
| 6,217,213 B1 | * | 4/2001 | Curry et al. ................... 374/178 |
| 6,850,125 B2 | * | 2/2005 | Norman et al. ........ 374/E15.001 |
| 7,148,832 B2 | * | 12/2006 | Wada et al. ................... 341/155 |
| 7,545,208 B2 | * | 6/2009 | Rodriguez ...................... 330/58 |
| 7,923,665 B2 | * | 4/2011 | Matsumoto et al. .......... 374/120 |
| 2005/0104674 A1 | * | 5/2005 | Norman et al. ................... 374/1 |
| 2005/0270215 A1 | * | 12/2005 | Wada et al. ................... 341/155 |
| 2007/0005289 A1 | * | 1/2007 | Huang .......................... 702/130 |
| 2007/0109054 A1 | * | 5/2007 | Rodriguez .................... 330/295 |
| 2007/0147468 A1 | * | 6/2007 | Matsumoto et al. .......... 374/100 |
| 2007/0216468 A1 | * | 9/2007 | Duarte .......................... 327/513 |
| 2008/0144415 A1 | * | 6/2008 | Macerola et al. ............. 374/163 |
| 2009/0010301 A1 | * | 1/2009 | Nagahisa .......................... 374/1 |
| 2009/0242545 A1 | * | 10/2009 | Matsumoto et al. .......... 374/163 |
| 2010/0020842 A1 | * | 1/2010 | Riddle et al. ..................... 374/1 |

FOREIGN PATENT DOCUMENTS

JP      06-184505 A     7/1996  
JP      2006-242894       9/2006

* cited by examiner

*Primary Examiner* — Yaritza Guadalupe-McCall  
(74) *Attorney, Agent, or Firm* — Dickstein Shapiro LLP

(57) ABSTRACT

A temperature detection circuit includes a first voltage source circuit to generate a first voltage having a temperature dependence by utilizing a work function difference of gate electrodes of a plurality of field effect transistors, a second voltage source circuit to generate a reference voltage having no temperature dependence by utilizing a work function difference of gate electrodes of a plurality of field effect transistors, a correction circuit configured to correct the reference voltage and output a corrected voltage, and a subtraction amplifier configured to subtract the corrected voltage from the first voltage, amplify a resulting subtracted voltage, and output a resulting amplified voltage as a correction voltage signal to adjust a temperature coefficient of the correction voltage signal.

12 Claims, 6 Drawing Sheets

TEMPERATURE DETECTION CIRCUIT

CROSS-REFERENCE TO RELATED APPLICATION

This patent specification is based on and claims priority from Japanese Patent Application No. 2007-174019 filed on Jul. 2, 2007 in the Japan Patent Office, the entire contents of which are hereby incorporated by reference herein.

BACKGROUND

1. Field of the Invention

The present invention relates to a temperature detection circuit, and more specifically, to a temperature detection circuit capable of high-accuracy temperature detection under low power voltage conditions.

2. Description of the Related Art

Recently, there is increasing demand for portable devices, such as mobile phones, that are capable of low voltage operation with low power consumption. For such devices, it is extremely important to have a high-accuracy temperature detection circuit capable of operating under such low power voltage conditions.

FIG. 1 is a circuit diagram of a known temperature detection circuit. The temperature detection circuit includes a first voltage source circuit 101, which generates a voltage that is a linear function of absolute temperature, a second voltage source circuit 102, which generates a predetermined reference voltage that is not affected by the ambient temperature, and a subtraction circuit 103.

FIG. 2 is an example circuit for the first and second voltage source circuits 101 and 102. In FIG. 2, each reference in left-hand side represents a part with respect to the first voltage source circuit 101. Each reference in right-hand side represents the corresponding part with respect to the second voltage source circuit 102. The first voltage source circuit 101 includes two field effect transistors, M101$a$ and M102$a$, and has a circuit configuration equal to the second voltage source circuit 102 excepting a ratio between a gate width W and a gate length L of the two field effect transistors, M101$a$ and M102$a$.

The field effect transistor M101$a$ is a depletion-type field effect transistor (FET) having a gate containing an n-type impurity concentration. The field effect transistor M102$a$ is an enhancement-type field effect transistor having a gate containing a p-type impurity concentration.

The first voltage source circuit 101 outputs a PTAT (proportional-to-absolute-temperature) voltage by adjusting a ratio between the channel lengths of the field effect transistors M101$a$ and M102$a$. Similarly, the second voltage source circuit 102 outputs a predetermined voltage by adjusting a ratio between the channel lengths of the field effect transistors M101$b$ and M102$b$. Since the PTAT voltage output from the first voltage source circuit 101 has a small temperature dependence, it is not possible to form a high-accuracy temperature detection circuit only with the first voltage source circuit 101. Accordingly, the temperature detection circuit includes the second voltage source circuit 102 (i.e., a reference voltage generator) and the subtraction amplifier 103 which subtracts a reference voltage output from the second voltage source circuit 102 from the PTAT voltage output from the first voltage source circuit 101 as shown in FIG. 1. With this circuit configuration, the temperature detection circuit can operate with high accuracy even under low voltage conditions.

As for the first voltage source circuit 101, an output voltage of the first voltage source circuit 101 is determined by a value of a formula, $$\{Vth102-(\beta101/\beta102)^{1/2} \times Vth101\}$$

where Vth101 is threshold voltage, $\beta$101 is conductivity coefficient for the field effect transistors M101$a$, Vth102 is threshold voltage, and $\beta$102 is conductivity coefficient for the field effect transistors M101$b$. According to results of a number of experiments, it is found that the value of the formula has fluctuation in temperature coefficient (temperature dependence) and fluctuation in DC voltage due to variations occurring during manufacturing processes.

As for the second voltage source circuit 102, it is also found that the reference voltage has fluctuation in DC voltage due to variations occurring during manufacturing processes, and moreover the fluctuation in DC voltage is not small according to results of a number of experiments. Further, an input offset voltage is generated at each input terminal of the subtraction amplifier 103. The input offset voltage also has fluctuation in temperature coefficient and fluctuation in DC voltage due to variations occurring during manufacturing processes according to the results of a number of experiments similar to the value of the above-described formula $\{Vth102-(\beta101/\beta102)^{1/2} \times Vth101\}$.

An output voltage $V_{temp}$ of the subtraction amplifier 103, obtained by subtracting the reference voltage output from the second voltage source circuit 102 from the PTAT voltage output from the first voltage source circuit 101 is expressed by the following formula:

$$V_{temp} = k1 \times T + k2 + \sigma_{temp1} \times T + \sigma_{temp2} \tag{a}$$

where T is temperature, K1 and K2 are coefficients determined by a subtraction rate and a gain, and $\sigma_{temp1}$ and $\sigma_{temp2}$ are coefficients determined by the multiplication factor of the subtraction amplifier 103, the fluctuation of the formula $\{Vth102-(\beta101/\beta102)^{1/2} \times Vth101\}$, and the input offset voltage.

Another known temperature detection circuit includes a first voltage source circuit to generate a first voltage by utilizing a work function difference between the gates of the two field effect transistors, a second voltage source circuit to generate a reference voltage by utilizing a work function difference between the gates of a plurality of field effect transistors, and a subtraction circuit which subtracts the reference voltage from the first voltage. However, the formula (a) indicates that the output voltage $V_{temp}$ includes both fluctuations in temperature coefficient and DC voltage. When the gain of the subtraction amplifier 103 increases, the fluctuations in the PTAT voltage, the reference voltage and the input offset voltage of the subtraction amplifier 103 also increase. Accordingly, it may not be possible to accurately detect an ambient temperature around the device under low voltage conditions with known temperature detection circuits.

SUMMARY

This patent specification describes a novel temperature detection circuit that includes a first voltage source circuit to generate a first voltage having a temperature dependence by utilizing a work function difference of gate electrodes of a plurality of field effect transistors, a second voltage source circuit to generate a reference voltage having no temperature dependence by utilizing a work function difference of gate electrodes of a plurality of field effect transistors, a correction circuit configured to correct the reference voltage and output a corrected voltage, and a subtraction amplifier configured to subtract the corrected voltage from the first voltage, amplify a resulting subtracted voltage, and output a resulting amplified voltage as a correction voltage signal to adjust a temperature coefficient of the correction voltage signal.

This patent specification further describes a novel temperature detection circuit which includes a first voltage source circuit to generate a first voltage having a temperature dependence by utilizing a work function difference of gate electrodes of a plurality of field effect transistors, a second voltage source circuit to generate a reference voltage having no temperature dependence by utilizing a work function difference of gate electrodes of a plurality of field effect transistors, a subtraction amplifier configured to subtract the corrected voltage from the first voltage, amplify a resulting subtracted voltage, and output a resulting amplified voltage so as to correct a temperature coefficient in an output voltage output from the subtraction amplifier, an A/D conversion circuit configured to convert the output voltage of the subtraction amplifier and output a converted digital signal, and a correction circuit configured to correct the converted digital signal and output a corrected digital signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
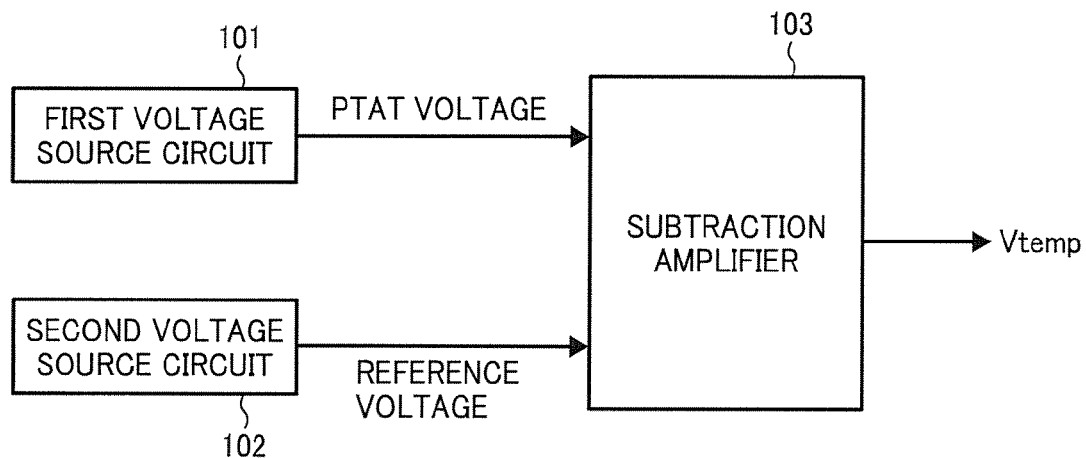
FIG. 1 is a circuit diagram of a known temperature detection circuit.
Figure 2:
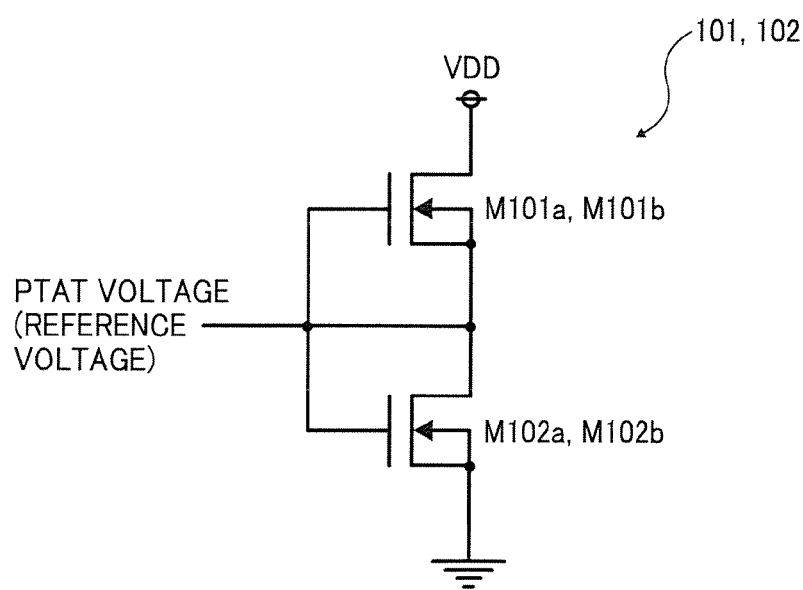
FIG. 2 is an example circuit for first and second voltage source circuits used in the temperature detection circuit of FIG. 1.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, temperature detection circuits according to exemplary embodiments of the present invention are described.

FIRST EXAMPLE EMBODIMENT

Figure 3:
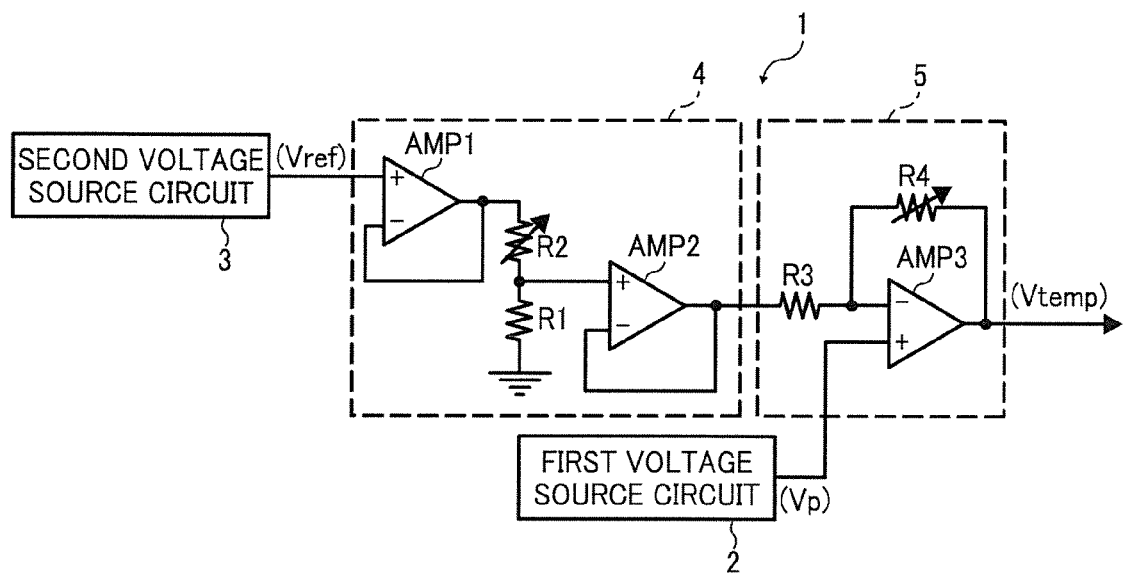
FIG. 3 is an example circuit of a temperature detection circuit according to a first example embodiment.

FIG. 3 is an example circuit of a temperature detection circuit according to a first example embodiment. In FIG. 3, the temperature detection circuit 1 includes a first and second voltage sources 2 and 3, a correction circuit 4, and an subtraction amplifier circuit 5. The first voltage source circuit 2 generates a positive PTAT voltage Vp having a negative temperature dependence by utilizing a work function difference of gate electrodes of two field effect transistors.

The second voltage source circuit 3 generates a reference voltage $V_{ref}$ having no temperature dependence using a work function difference of gate electrodes of two field effect transistors. The correction circuit 4 corrects the reference voltage $V_{ref}$ output from the second voltage source circuit 3, and outputs a corrected reference voltage $V_{ref}$. The subtraction amplifier circuit 5 subtracts the reference voltage $V_{ref}$ output from second voltage source circuit 3 from the PTAT voltage Vp output from the first voltage source circuit 2, amplifies and outputs an amplified voltage as an output voltage $V_{temp}$ to improve temperature sensitivity and achieve low power consumption.

The correction circuit 4 is formed of operational amplifiers AMP1 and AMP2, and resistors R1 and R2. The subtraction amplifier circuit 5 is formed of an operational amplifier AMP3, and resistors R3 and R4. The resistors R1 and R3 are fixed resistor elements, and the resistors R2 and R4 are variable resistor elements.

As for the operational amplifiers AMP1 and AMP2 in the correction circuit 4, each output terminal is connected to an inverted input terminal, respectively, so as to form a voltage-follower circuit. The reference voltage $V_{ref}$ is input to a non-inverted terminal of the of the amplifier AMP1. The resistors R1 and R2 are connected in series between an output terminal of the operational amplifier AMP1 and ground. A connection node of the resistors R1 and R2 is connected to a non-inverted terminal of the operational amplifier AMP2, and an output terminal of the operational amplifier AMP2 is an output terminal of the correction circuit 4.

In the subtraction amplifier circuit 5, the resistors R3 is connected between the output terminal of the operational amplifier AMP2 and an inverted terminal of the operational amplifier AMP3. Further, the resistors R4 is connected between an output terminal and the inverted terminal of the operational amplifier AMP3. The PTAT voltage Vp is input to a non-inverted terminal of the operational amplifier AMP3. An output voltage $V_{temp}$ is output from the output terminal of the operational amplifier AMP3.

The first voltage source circuit 2 forms a first voltage source circuit unit, the second voltage source circuit 3 forms a second voltage source circuit unit. The correction circuit 4 forms a correction circuit unit, and the subtraction amplifier circuit 5 forms a subtraction amplifier unit. Further, the operational amplifier AMP1 forms a first impedance conversion circuit, the operational amplifier AMP2 forms a second impedance conversion circuit, and the resistors R1 and R2 form a dividing circuit.

Figure 4:
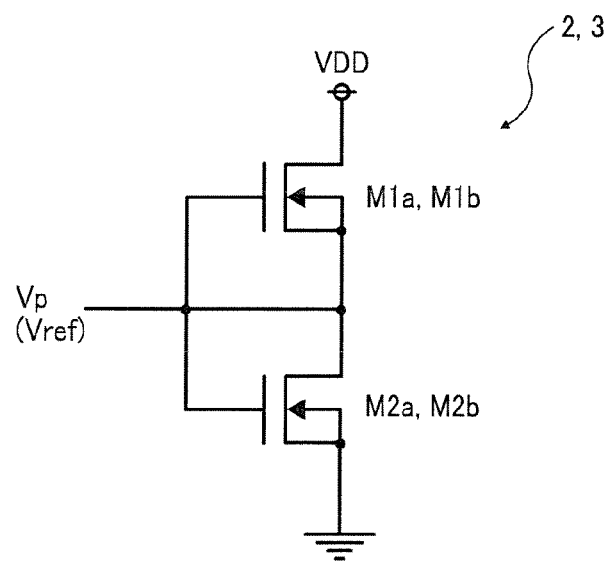
FIG. 4 is an example circuit for first and second voltage source circuits used in the temperature detection circuit of FIG. 3.

FIG. 4 is an example circuit for the first and second voltage source circuits 2 and 3 of FIG. 3. In FIG. 4, each reference in left-hand side represents a part with respect to the first voltage source circuit 2, and each reference in right-hand side represents the corresponding part of the second voltage source circuit 3. The first voltage source circuit 2 includes two field effect transistors M1*a* and M2*a*, and has a circuit configuration equal to the second voltage source circuit 3 expecting a ratio between a gate width W and a gate length L on two field effect transistors of the second voltage source circuit 3. Accordingly, the first voltage source circuit 2 will be now described.

The field effect transistor M1*a* is a depletion-type field effect transistor having a gate containing an n-type impurity concentration. The field effect transistor M2*a* is an enhancement-type field effect transistor having a gate containing a p-type impurity concentration.

The first voltage source circuit 2 generates the PTAT voltage Vp having a temperature dependence by utilizing a work function difference of the field effect transistors M1*a* and M2*a* having different conductive polarity from each other. The field effect transistor M1*a* forms a first field effect transistor, the field effect transistor M2*a* forms a second field effect transistor, and the PTAT voltage Vp forms a first voltage. Between power supply terminal VDD and ground, the field effect transistors M1*a* and M2*a* are connected in series. Each gate of the field effect transistors M1*a* and M2*a* is commonly connected, and is connected to a connection node between the field effect transistors M1*a* and M2*a*. The connection node between the field effect transistors M1*a* and M2*a* is an output terminal to output the PTAT voltage. Further, each substrate gate of the field effect transistors M1*a* and M2*a* is connected to a source, respectively.

Similarly to the first voltage source circuit 2, the second voltage source circuit 3 includes two field effect transistors M1*b* and M2*b*. The field effect transistor M1*b* is a depletion-type field effect transistor having a gate containing an n-type impurity concentration. The field effect transistor M2*b* is an enhancement-type field effect transistor having a gate containing a p-type impurity concentration.

The second voltage source circuit 3 generates a reference voltage $V_{ref}$ having no temperature dependence by utilizing a work function difference of the field effect transistors M1*b* and M2*b* having different conductive polarity from each other. The field effect transistor M1*b* forms a third field effect transistor, and the field effect transistor M2*b* forms a fourth field effect transistor.

Between power supply terminal VDD and ground, the field effect transistors M1*b* and M2*b* are connected in series. Each gate of the field effect transistors M1*b* and M2*b* is commonly connected, and is connected to a connection node between the field effect transistors M1*b* and M2*b*. The connection node between the field effect transistors M1*b* and M2*b* is an output terminal to output the reference voltage $V_{ref}$. Further, each substrate gate of the field effect transistors M1*b* and M2*b* is connected to a source, respectively.

The first voltage source circuit 2 outputs the PTAT voltage Vp by adjusting a ratio between the channel lengths of the field effect transistors M1*a* and M2*a*. Similarly, the second voltage source circuit 3 outputs the predetermined reference voltage $V_{ref}$ by adjusting a ratio between the channel lengths of the field effect transistors M1*b* and M2*b*.

When a threshold voltage of the field effect transistors M1*a* is defined as Vth1, and an impurity concentration of the gate is defined as Ng in the first voltage source circuit 2, and a threshold voltage of the field effect transistors M2*a* is defined as Vth2, and an impurity concentration of the gate is Pg, the Vth1 and Vth2 are then expressed by formulas (1) and (2), $$Vth1 = \phi m(Ng) - \phi s - Qf/Cox + 2 \times \phi f - Qb/Cox \quad (1)$$

$$Vth2 = \phi m(Pg) - \phi s - Qf/Cox + 2 \times \phi f - Qb/Cox \quad (2)$$

where ϕm is a work function of the gate, ϕs is a work function of substrate, Qf is charge amount of fixed charges in oxide, Cox is capacitance per unit area of the oxide, Qb is charge amount in a depletion layer between inversion layer and substrate, and ϕf is Fermi level of the substrate.

Further, the work function of gate ϕm is expressed by a formula (3), $$\phi m \approx \chi + Eg/2 \pm \phi f \quad (3)$$

where Eg is band gap of the silicon. As for a sign of third term in right-hand side in the formula (3), plus sign is used when impurity type of the gate is p-type, and minus sign is used when impurity type of the gate is n-type.

When a conductivity coefficient of the field effect transistor M1*a* is defined as β1 and a conductivity coefficient of the field effect transistor M2*a* is defined as β2, a formula (4) will be obtained.

$$Vth2 - (\beta1/\beta2)^{1/2} \times Vth1 = \phi m(Ng) - (\beta1/\beta2)^{1/2} \times \phi m(Pg) - \{1-(\beta1/\beta2)^{1/2}\} \times (\phi s + Qf/Cox - 2\times\phi f + Qb/Cox) = -\{\log(Ng/Ni) + (\beta1/\beta2)^{1/2} \log(Pg/Ni)\} \times kT/q + \{1-(\beta1/\beta2)^{1/2}\} \times \{\chi + Eg/2 - (\phi s + Qf/Cox - 2\times\phi f) + Qb/Cox\} \quad (4)$$

where k is Boltzmann constant, q is electrical charge of electron, T is absolute temperature, and Ni is carrier concentration of intrinsic semiconductor.

A coefficient of first term in right-hand side of the formula (4) $-\{\log(Ng/Ni)+(\beta1/\beta2)^{1/2}\log(Pg/Ni)\}$, has a temperature dependence. However, a value of the temperature dependence is extremely small. Similarly, a coefficient of second term in right-hand side of the formula (4), $\{1-(\beta1/\beta2)^{1/2}\}\times\{\chi+Eg/2-(\phi s+Qf/Cox-2\times\phi f)+Qb/Cox\}$ has a temperature dependence. However, the temperature dependence is extremely small. Based on results of a number of experiments, it is found that term $Vth2-(\beta1/\beta2)F \times Vth1$, in the formula (4) has fluctuation in temperature coefficient and fluctuation in DC voltage due to variations occurring during manufacturing processes. Accordingly, the formula (4) can be simplified and expressed by a formula (5)

$$Vth2 - (\beta1/\beta2)^{1/2} \times Vth1 = (av + \sigma a) \times T + bv + \sigma b \quad (5)$$

where "σa" and "σb" represent the variations occurring during manufacturing processes. "σa" represents the fluctuation in temperature coefficient of $\{Vth2-(\beta1/\beta2)^{1/2}\times Vth1\}$, "σb" represents the fluctuation in the DC voltage of $\{Vth2-(\beta1/\beta2)^{1/2}\times Vth1\}$.

The reference voltage $V_{ref}$ generated by the second voltage source circuit 3 also has a temperature dependence. However, it is found that the fluctuation in temperature coefficient and the fluctuation in DC voltage due to variations occurring during manufacturing processes are not small based on results of a number of experiments.

Based on facts described above, the output voltage $V_{temp}$ output from the operational amplifier AMP3 is measured at normal temperature T1 and at high temperature T2 which is higher than the normal temperature T1 at first. Then, resistances of the resistors R2 and R4 are adjusted based on data of two output voltages $V_{temp}$ obtained by the measurements so that the temperature detection circuit 1 outputs a voltage which has a desired temperature coefficient and DC voltage level. Trimming method using a laser equipment is commonly used to adjust the resistances of the resistors R2 and R4. The trimming method for adjusting the resistances of the resistors R2 and R4 will be now described.

The reference voltage $V_{ref}$ is input to the non-inverted terminal of the operational amplifier AMP1. The reference voltage $V_{ref}$ is generated by the second voltage source circuit 3 and has no temperature dependence. The PTAT voltage Vp is input to the non-inverted terminal of the operational amplifier AMP3. The PTAT voltage Vp is a linear function of absolute temperature and has a negative primary coefficient.

When each resistance of the resistors R1, R2, R3 and R4 is defined as r1, r2, r3 and r4, respectively, the output voltage $V_{temp}$ output from the operational amplifier AMP3 is expressed by a formula (6), $$V_{temp} = (r4/r3+1) \times Vp - r4/r3 \times \{r1/(r1+r2)\} \times V_{ref} \quad (6)$$

Now, the output voltage $V_{temp}$ before trimming on the resistors R2 and R4 by the laser equipment is defined as Vt, and the output voltage $V_{temp}$ after trimming is defined as Vt1. The output voltage Vt1 after trimming has a predetermined temperature coefficient and DC voltage level. Ratios of the resistances r4/r3 and r2/r1 are determined so that the temperature coefficient of the output voltage Vt is smaller than the temperature coefficient of the output voltage Vt1 and the output voltage Vt is smaller than the output voltage Vt1 within a whole operating range.

First, the reference voltage $V_{ref}$ and the output voltage Vt are measured at normal temperature T1. Secondly, the output voltage Vt is measured at high temperature T2 which is higher than the normal temperature T1. Now, a temperature coefficient of the output voltage Vt1 is defined as av, the output voltage Vt1 at temperature T1 is defined as Vt1 (T1). Further, Vt1 (T1) is defined as $V_{obj}$, Vt1 (T1)=$V_{obj}$. By trimming, the resistance r2 of the resistor R2 becomes a resistance r2t, and the resistance r4 of the resistor R4 becomes a resistance r4t. When the output voltage Vt at temperature T is defined as Vt (T), Vt1 (T) which is the output voltage Vt1 at temperature T is expressed by a formula (7).

$$Vt1(T) = (r4t/r3+1) \times Vt(T) - r4t/r3 \times \{r1/(r1+r2t)\} \times V_{ref} \quad (7)$$

Since the temperature coefficient of the output voltage Vt1 is av and Vt1 (T1)=$V_{obj}$, formulas (8) and (9) are obtained.

$$\{Vt1(T2) - Vt1(T1)\}/(T2-T1) = av \quad (8)$$

$$(r4t/r3+1) \times Vt(T1) - (r4t/r3) \times r1/(r1+r2t)\} \times V_{ref} = Vobj = Vt(T1) \quad (9)$$

Then, the formulas (8) and (9) become formulas (10) and (11), $$r4t/r3 = av \times (r4/r3+1) \times (T2-T1)/\{Vt1(T2) - Vt1(t1)\} - 1 \quad (10)$$

$$r2t/r1 = r4t/r3 \times V_{ref}/[(1+r4t/r3) \times (r3 \times Vt(T)/(r4+r3) + r4 \times r1 \times V_{ref}/\{(r4+r3) \times (r1+r2)\} - V_{obj})] - 1 \quad (11)$$

A trimming is performed to the resistors R2 and R4 based on relations expressed by the formulas (10) and (11) so that each resistance of the resistors R2 and R4 becomes r2t and r4t.

Figure 5:
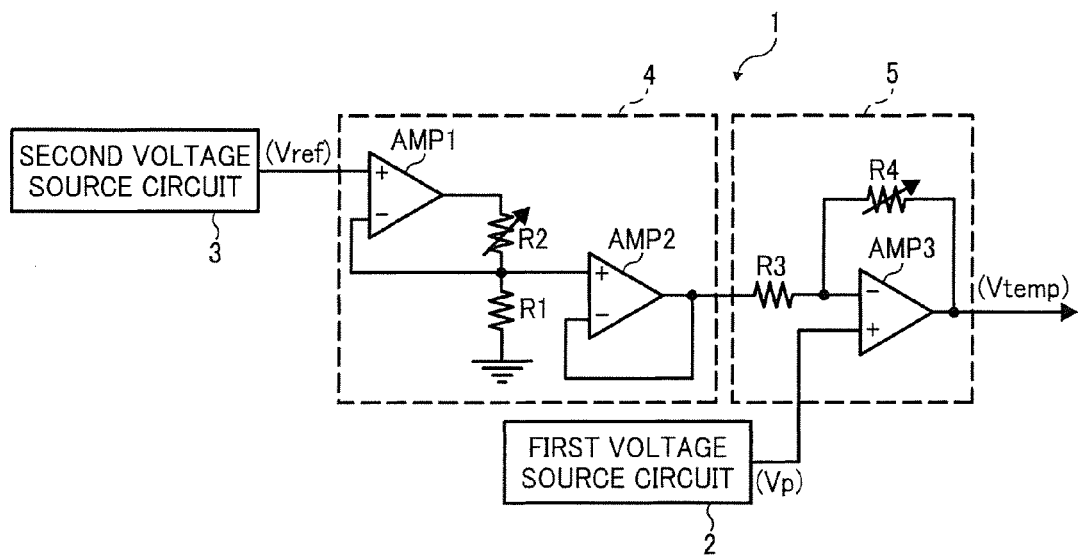
FIG. 5 is another example circuit of the temperature detection circuit according to the first example embodiment.

By performing trimming of the resistance of the resistor R2, the DC voltage of the output voltage $V_{temp}$ can be adjusted at 25° C. By performing trimming of the resistance of the resistor R4, amount of voltage change in the output voltage $V_{temp}$ with respect to temperature change can be adjusted. As shown in FIG. 3, the correction circuit 4 performs a correction by dividing the reference voltage $V_{ref}$ however, the correction circuit 4 may performs the correction by pumping up the reference voltage $V_{ref}$ as shown in FIG. 5. In FIG. 5, the inverted input terminal of the operating amplifier AMP1 is connected to a connection node between the resistors R1 and R2 differently from the correction circuit 4 of FIG. 3.

Figure 6:
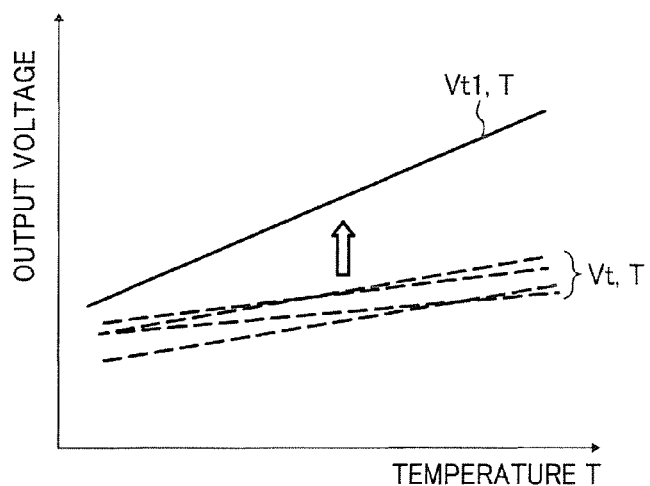
FIG. 6 is a graph to show temperature dependence of an output voltage.

FIG. 6 is a graph to show temperature dependence of the output voltage. Referring to FIG. 6, it is found that the output voltage Vt (T) having fluctuations in the temperature coefficient and DC voltage is corrected to the output voltage Vt1 (T) which has a predetermined temperature coefficient and DC voltage.

Thus, the temperature detection circuit according to the first example embodiment corrects both the fluctuation of temperature coefficient and the fluctuation of DC voltage due to variations occurring during manufacturing processes. Accordingly, it is possible to achieve a temperature detection circuit which can operates with a high-accuracy even under low voltage conditions.

SECOND EXAMPLE EMBODIMENT

In the temperature detection circuit according to the first example embodiment, the temperature detection circuit outputs an analog signal. In a second example embodiment, a temperature detection circuit outputs a digital signal.

Figure 7:
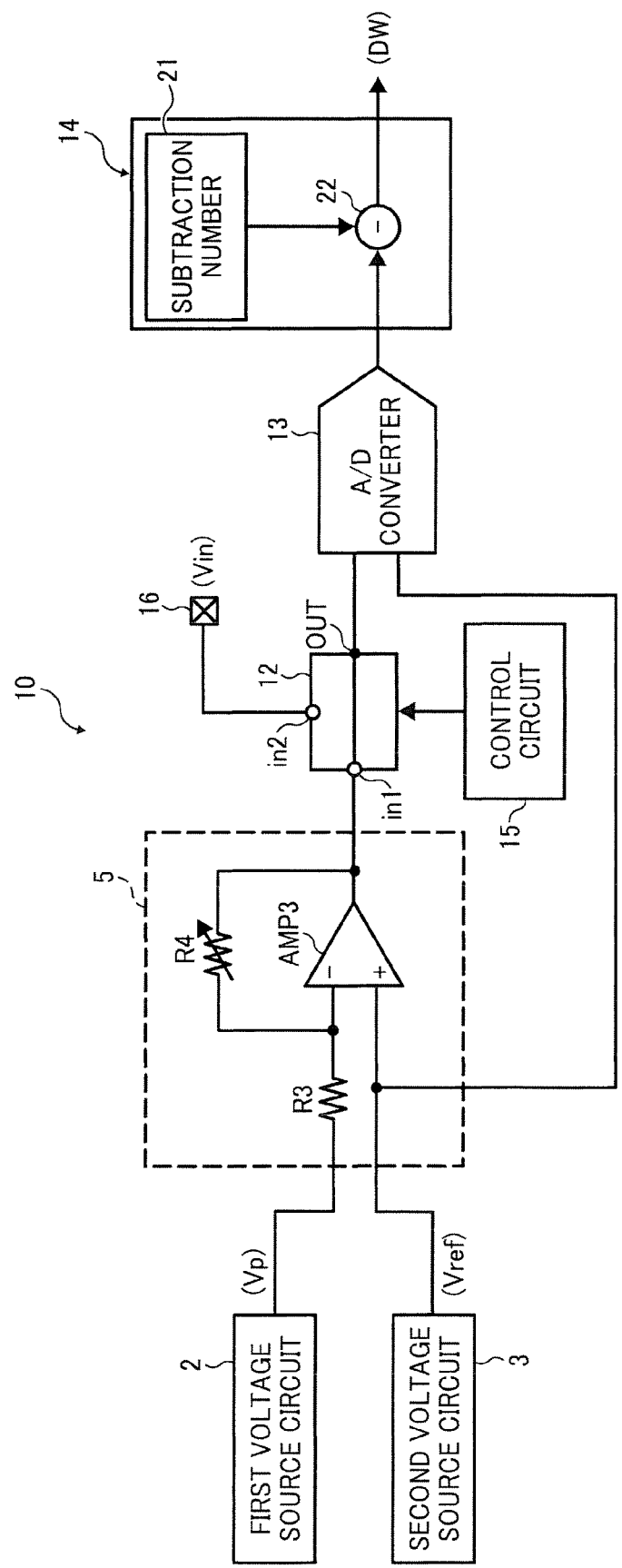
FIG. 7 is a circuit diagram of the temperature detection circuit according to a second example embodiment.

FIG. 7 is a circuit diagram of the temperature detection circuit according to the second example embodiment. In FIG. 7, identical reference characters are assigned to identical or similar circuit members shown in FIG. 3 and descriptions thereof are omitted.

Figure 8:
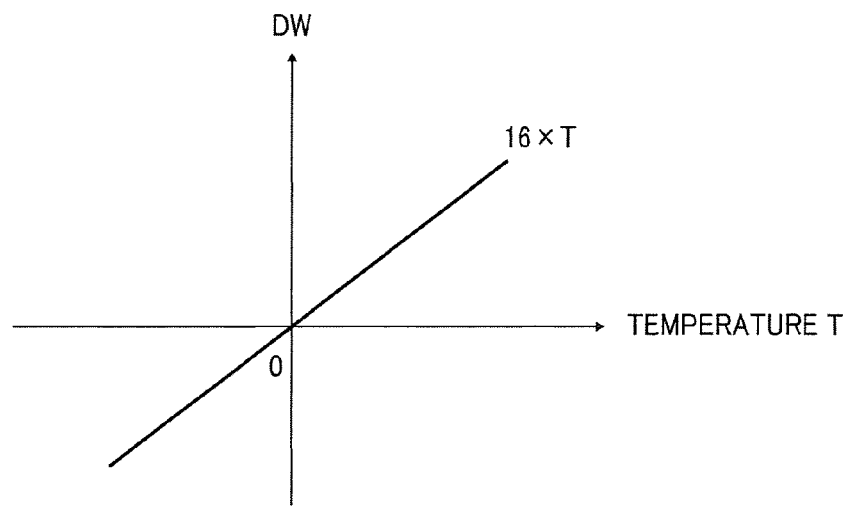
FIG. 8 is a graph to show temperature dependence of the output voltage of the temperature detection circuit according to the second example embodiment.

The temperature detection circuit 10 outputs a digital signal which is in directly proportional to temperature T as a line shown in FIG. 8, and a coefficient of the line is determined to be "16". A digital value of "0" is output at 0° C., therefore, the temperature detection circuit 10 has a resolution of 0.0625° C.

The temperature detection circuit 10 includes a first and second voltage source circuits 2 and 3, an subtraction amplifier circuit 5, a switch 12, a double integration A/D (analog to digital) converter 13, a digital subtraction circuit 14, and a control circuit 15. The double integration A/D converter 13 and the control circuit 15 form an A/D conversion circuit, the digital subtraction circuit 14 forms a correction circuit.

A PTAT voltage Vp output from the first voltage source circuit 2 is input to an inverted terminal of the operational amplifier AMP3 through the resistor R3. A reference voltage $V_{ref}$ output from the second voltage source circuit 3 is input to a non-inverted terminal of the operational amplifier AMP3. An input terminal in1 of the switch 12 is connected to an output terminal of the operational amplifier AMP3, and another input terminal in2 of the switch 12 is connected to an external terminal 16.

The switch 12 connects an output terminal OUT of the switch 12 to either the input terminal in1 or the input terminal in2 in accordance with a control signal output from the control circuit 15. The output terminal OUT of the switch 12 is connected to an input terminal of the A/D converter 13. Further, the reference voltage $V_{ref}$ is input to the A/D converter 13.

The digital subtraction circuit 14 includes a setting circuit 21 and a subtraction circuit 22. The setting circuit 21 sets a subtraction number. A digital value output from the A/D converter 13 is input to the subtraction circuit 22. The digital subtraction circuit 14 subtracts the subtraction number held by the setting circuit 21 from the digital value output from the A/D converter 13. The digital subtraction circuit 14 then outputs a subtracted value as an output signal DW of the temperature detection circuit 10.

With this circuit configuration, the subtraction amplifier circuit 5 corrects fluctuation in temperature coefficient of the output signal DW due to variation occurring during the manufacturing processes by adjusting the resistance of the resistor R4 by trimming process with a laser equipment. Meanwhile, the digital subtraction circuit 14 corrects the digital value output from the A/D converter 13 when the digital value output from the A/D converter 13 is not a predetermined value.

Thus, the temperature coefficient of the output signal DW of the temperature detection circuit 10 is corrected by trimming of the resistance r4 of the resistor R4 of the subtraction amplifier circuit 5. Accordingly, a ratio of the resistances r4/r3 is required to be determined to satisfy that the output voltage of the subtraction amplifier circuit 5 is smaller than the desired value before trimming treatment, i.e., "16", and is less than a maximum voltage the A/D converter 13 can perform an A/D conversion within an operational temperature range.

In the temperature detection circuit 10 according to the second example embodiment, a known double integration A/D converter can be used. Now, the double integration A/D converter will be described briefly.

Figure 9:
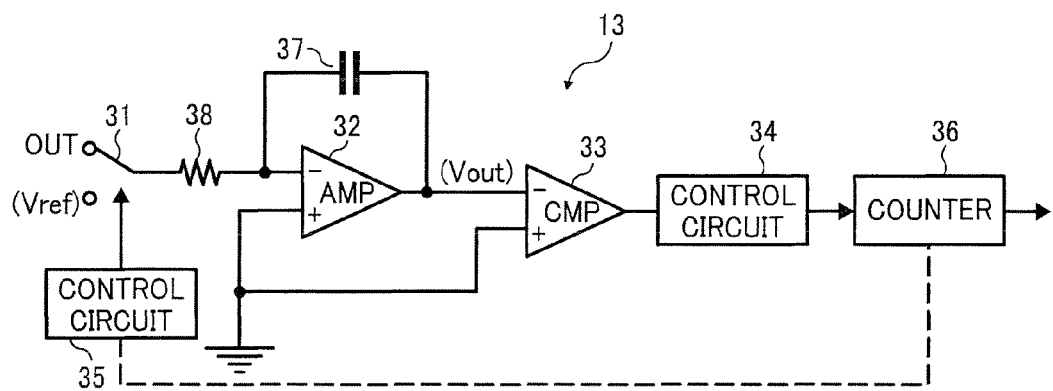
FIG. 9 is a circuit diagram of a double integration A/D converter of FIG. 7.

FIG. 9 is a circuit diagram of the double integration A/D converter 13. The double integration A/D converter 13 includes a switch 31, an operational amplifier 32, a comparator 33, control circuits 34 and 35, a counter 36, a capacitor 37, and a resistor 38.

The output terminal OUT of the switch 12 is connected to an input terminal of the switch 31, and the reference voltage $V_{ref}$ is input to another input terminal of the switch 31. The switch 31 connects one end of the resistor 38 to either an output signal output from the switch 12 or the reference voltage $V_{ref}$ in accordance with a control signal output from the control circuit 35. Another end of the resistor 38 is connected to an inverted input of the operational amplifier 32.

Between an output terminal and the inverted input terminal of the operational amplifier 32, the capacitor 37 is connected. Further, a non-inverted terminal of the operational amplifier 32 is connected to ground. The output terminal of the operational amplifier 32 is connected to an inverted input terminal of the comparator 33, and a non-inverted input of the comparator 33 is connected to ground. An output signal output from the comparator 33 is input to the control circuit 34. The control circuit 34 controls the counter 36 in accordance with the output signal out from the comparator 33. A count value of the counter 36 is output to the subtraction circuit 22 of the digital subtraction circuit 14 as an output signal of the A/D converter 13. The control circuit 35 changes a connection of the switch 31 in accordance with the count value of the counter 36.

Figure 10:
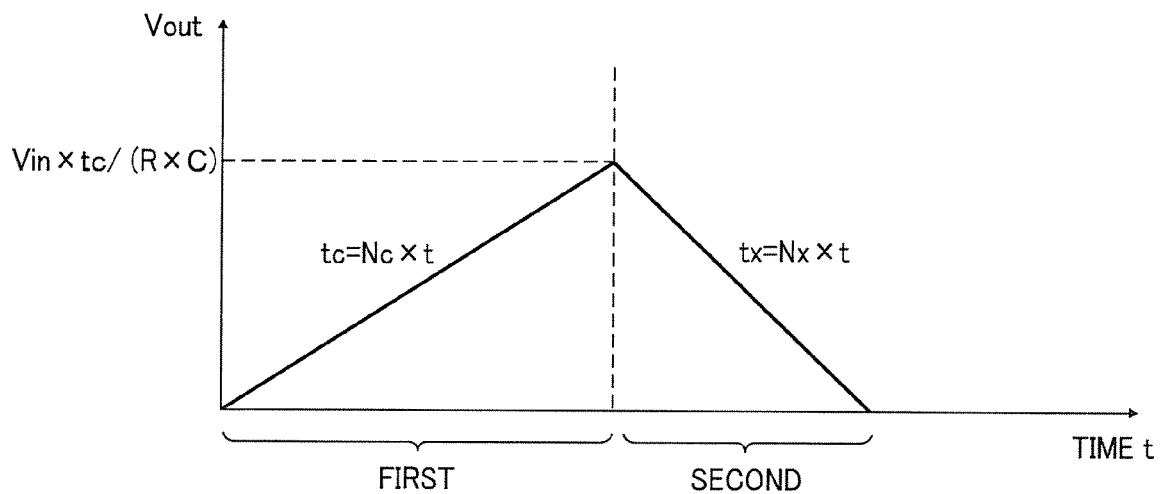
FIG. 10 is a graph showing an output voltage output from an operational amplifier of an A/D converter of FIG. 7 from start of an A/D conversion.

FIG. 10 is a graph showing a relation between an output voltage $V_{out}$ output from the operational amplifier 32 of an A/D converter 13 and an elapsed time t since the A/D converter 13 starts an A/D conversion operation. Referring to FIG. 10, a detecting operation to detect variation in characteristics of the A/D converter 13 will be described. In FIG. 10, a capacitance of the capacitor 37 is C, and a resistance of the resistor 38 is R. In this case, the output terminal OUT of the switch 12 is connected to the input terminal in2 of the switch 12 by the control circuit 15. Accordingly, a voltage at the output terminal OUT of the switch 12 is equal to the input voltage Vin which is an input voltage input to the external terminal 16.

As shown in FIG. 10, the A/D conversion operation includes two phases. In the first phase, the switch 31 connects the output terminal OUT of the switch 12 to connect the voltage Vin which is a minus voltage of an absolute value to be converted to a digital value. Accordingly, the capacitor 37 is charged during a predetermined time period tc. An counter number is zero at start-up of charging-up of the capacitor 37 in one pulse (one cycle) of the counter 36. At end of charging-up of the capacitor 37, i.e., time period tc, the counter number Nc is expressed by a formula, Nc=tc/t.

In the second phase, the switch 31 connects the reference voltage $V_{ref}$ by the control circuit 35, and the counter 36 is reset to zero. In this embodiment, the reference voltage is used, however, the reference voltage can be replaced by any bias voltage which is independent from the input voltage Vin, an ambient temperature, and other environmental conditions. When the reference voltage $V_{ref}$ is connected, the charge stored in the capacitor 37 discharges. An elapsed time, which is a time since the charge stored in the capacitor 37 starts to discharge until the charge has completely discharged, is measured by detecting an inversion occurrence of an output signal of the comparator 33.

When a time measured is defined as tx and a count value of the counter 36 at a completion of the discharge of the charge stored in the capacitor 37 is Nx, tx is expressed by a following formula, $$tx = Nx \times t.$$

Figure 11:
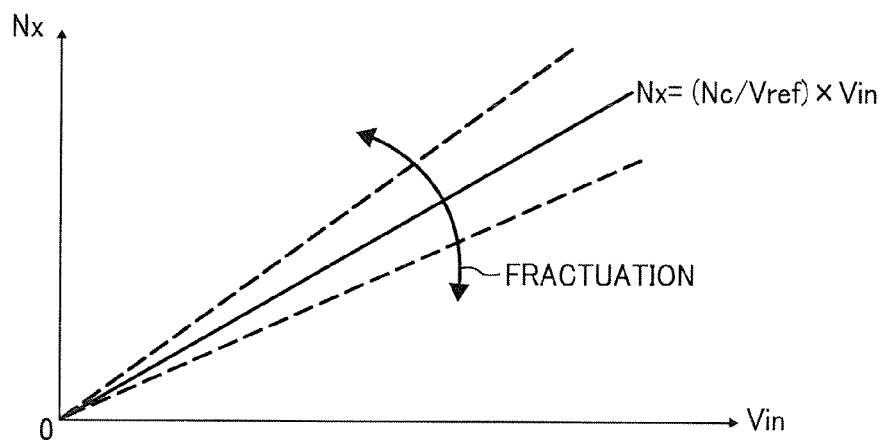
FIG. 11 is a graph showing a relation between an input voltage and digital value of a counter of FIG. 7.

The input voltage Vin is converted to a digital value Nx shown by a formula (12) as shown in FIG. 11.

$$Nx = Nc/V_{ref} \times Vin \quad (12)$$

Since the reference voltage $V_{ref}$ has fluctuation due to variations occurring during manufacturing, input-output characteristics of the A/D converter 13 has fluctuation also.

In the temperature detection circuit 10 of FIG. 7 similarly to the temperature detection circuit 1 of FIG. 3, the PTAT voltage Vp has fluctuation in temperature coefficient and fluctuation in DC voltage due to variations occurring during manufacturing processes. Further, the reference voltage $V_{ref}$ that is output voltage of the second voltage source 3 has fluctuation in DC voltage due to variations occurring during manufacturing processes. Accordingly, the output voltage of the temperature detection circuit 10 has fluctuation in temperature coefficient and fluctuation in the signal level due to variations occurring during manufacturing processes.

In the temperature detection circuit 10 of FIG. 7, corrections are performed with respect to both the fluctuation in temperature coefficient and the fluctuation in the signal level due to variations occurring during manufacturing processes based on the detection results of the output voltage from the temperature detection circuit 10 measured at normal and high temperatures. A correction operation will be described.

First, the input-output characteristics of the A/D converter 13 is identified by determining a coefficient $Nc/V_{ref}$ of the input voltage Vin in the formula (12). At normal temperature, the external terminal 16 is connected by the switch 12, and the output terminal OUT of the switch 12 is connected by the switch 31. Then, a predetermined voltage, such as reference voltage $V_{ref}$ is connected to the external terminal 16. The A/D converter 13 converts the reference voltage $V_{ref}$ to a digital value. When the A/D converter 13 converts the reference voltage $V_{ref}$, the converted value is defined as $NV_{ref}$. The coefficient $Nc/V_{ref}$ of the input voltage Vin in the formula (12) can be determined by relating the digital value $NV_{ref}$ to the reference voltage $V_{ref}$. As a result, a relation between the reference voltage $V_{ref}$ and the digital value $NV_{ref}$ is expressed by a formula, $Nx = NV_{ref}/V_{ref} \times Vin$.

Secondly, the input terminal in1 is connected at the switch 12 so that the output voltage of the operational amplifier AMP3 is input to the A/D converter 13. The output voltage of the temperature detection circuit 10 is measured at room temperature T1, and is defined as DW (T1). Further, the output voltage of the temperature detection circuit 10 is measured at a predetermined high temperature T2, and is defined as DW (T2).

A ratio of r4/r3 is adjusted to be r4t/r3 by trimming of the resistance r4 of the resistor R4 to r4t so that the temperature coefficient and the signal level of the output value of the temperature detection circuit 10 are desired values. The ratio r4t/r3 becomes a formula (13).

$$r4t/r3=16/\{DW(T2)-DW(T1)\}/(T2-T1) \quad (13)$$

After the resistance of the resistor R4 is adjusted by trimming, the output value of the temperature detection circuit 10 becomes a desired value, however, the signal level of the output value of the temperature detection circuit 10 is not the desired value. Therefore, a value represented by a following formula (14) needs to be subtracted by the digital subtraction circuit 14.

$$(1-r4t/r3) \times V_{ref} - (r4t/r3) \times \{DW(T1)/NV_{ref}/V_{ref}\} - 16 \times T1 \quad (14)$$

The subtraction number is generated by converting a value of the formula (14) to a binary value, and performing trimming on corresponding "bit"s in the digital subtraction circuit 14 using the laser equipment. The output value of the A/D converter 13 is then subtracted by the binary value of the formula (14). However, memory device such as RAM (Random Access Memory) can be used instead of setting the subtraction number by trimming.

In the temperature detection circuit according to the second example embodiment as described above, the output voltage DW (T1) at room temperature T1 and the output voltage DW (T2) at room temperature T2 of the temperature detection circuit are measured. The resistance of the resistor R4 and the corresponding "bits" are adjusted by performing trimming according to the formulas (13) and (14). Therefore, it is possible to output the digital value having the desired temperature coefficient and the signal level even by obtaining the output voltage DW (T1) at room temperature T1 and the output voltage DW (T2) at room temperature T2 of the temperature detection circuit 10. Accordingly, it is possible to detect temperature accurately by the temperature detection circuit 10 according to the second example embodiment.

Numerous additional modifications and variations are possible in light of the above teachings. It is therefore to be understood, that within the scope of the appended claims, the disclosure of this patent specification may be practiced otherwise than as specifically described herein.

What is claimed is:

1. A temperature detection circuit, comprising:
a first voltage source circuit configured to generate a first voltage having a temperature dependence by utilizing a work function difference of gate electrodes of a plurality of field effect transistors:
a second voltage source circuit configured to generate a reference voltage having no temperature dependence by utilizing a work function difference of gate electrodes of a plurality of field effect transistors;
a correction circuit configured to correct the reference voltage and output a corrected voltage; and
a subtraction amplifier configured to subtract the corrected voltage from the first voltage, amplify a resulting subtracted voltage, and output a resulting amplified voltage as a correction voltage signal to adjust a temperature coefficient of the correction voltage signal,
wherein the correction circuit divides the first voltage and adjusts the temperature coefficient of the correction voltage signal by changing a divisional ratio of the first voltage,
wherein the correction circuit includes:
a first impedance conversion circuit configured to perform impedance conversion of the reference voltage and output a converted voltage;
a dividing circuit configured to divide the converted voltage output from the first impedance conversion circuit to change a divisional ratio; and
a second impedance conversion circuit configured to perform impedance conversion of the output voltage of the dividing circuit and output a converted voltage.

2. The temperature detection circuit according to claim 1, wherein the subtraction amplifier includes:
an operational amplifier configured to input the first voltage at a first input terminal and output an amplified voltage from an output terminal as the output;
a fixed resistor connected between an output terminal of the correction circuit and a second input terminal of the operational amplifier; and
a variable resistor connected between the output terminal and the second input terminal of the operational amplifier,
wherein a temperature coefficient of the output voltage of the operational amplifier is adjusted by changing a resistance of the variable resistor.

3. The temperature detection circuit according to claim 1, wherein the first voltage source circuit includes:
a first field effect transistor having a gate containing an n-type impurity concentration and being a depletion-type; and
a second field effect transistor having a gate containing a p-type impurity concentration and being an enhancement-type,
wherein the temperature detection circuit generates a first voltage having a temperature dependence by utilizing a work function difference of polysilicon gate electrodes of the first and second field effect transistors having different polarities in impurity concentration.

4. The temperature detection circuit according to claim 3, wherein the first and second field effect transistors have different channel lengths.

5. The temperature detection circuit according to claim 1, wherein the second voltage source circuit includes:
a third field effect transistor having a gate containing an n-type impurity concentration and being a depletion-type; and
a fourth field effect transistor having a gate containing a p-type impurity concentration and being an enhancement-type,
wherein the temperature detection circuit generates a reference voltage having no temperature dependence by utilizing a work function difference of polysilicon gate electrodes of the third and fourth field effect transistors having different polarities in impurity concentration.

6. The temperature detection circuit according to claim 5, wherein the third and fourth field effect transistors have different channel lengths.

7. The temperature detection circuit according to claim 5, wherein a ratio of channel lengths of the third and fourth field effect transistors are determined so that the reference voltage has no temperature dependence.

8. A temperature detection circuit, comprising:
a first voltage source circuit configured to generate a first voltage having a temperature dependence by utilizing a work function difference of gate electrodes of a plurality of field effect transistors;
a second voltage source circuit configured to generate a reference voltage having no temperature dependence by utilizing a work function difference of gate electrodes of a plurality of field effect transistors;
a correction circuit configured to correct the reference voltage and output a corrected voltage; and a subtraction amplifier configured to subtract the corrected voltage from the first voltage, amplify a resulting subtracted voltage, and output a resulting amplified voltage as a correction voltage signal to adjust a temperature coefficient of the correction voltage signal, wherein the correction circuit boosts the first voltage, and performs correction of the reference voltage by changing a boosting ratio of the first voltage, wherein the correction circuit includes:

a first impedance conversion circuit configured to perform impedance conversion of the reference voltage and output a converted voltage;

a boost circuit configured to boost a converted voltage output from the first impedance conversion circuit to change a boosting ratio; and a second impedance conversion circuit configured to perform impedance conversion of the output voltage of the boost circuit and output a converted voltage.

9. A temperature detection circuit, comprising:

a first voltage source circuit configured to generate a first voltage having a temperature dependence by utilizing a work function difference of gate electrodes of a plurality of field effect transistors;

a second voltage source circuit configured to generate a reference voltage having no temperature dependence by utilizing a work function difference of gate electrodes of a plurality of field effect transistors;

a subtraction amplifier configured to subtract the corrected voltage from the first voltage, amplify a resulting subtracted voltage, and output a resulting amplified voltage so as to correct a temperature coefficient in an output voltage output from the subtraction amplifier;

an A/D conversion circuit configured to convert the output voltage of the subtraction amplifier and output a converted digital signal; and a correction circuit configured to correct the converted digital signal and output a corrected digital signal, wherein the A/D conversion circuit includes:

a switch configured to output a signal by selecting exclusively either the output voltage from the subtraction amplifier or an input voltage input externally;

an A/D converter configured to convert the input voltage input through the switch and output an A/D conversion signal; and a control circuit configured to control the switch.

10. The temperature detection circuit according to claim 9, wherein the subtraction amplifier includes:

an operational amplifier configured to input the first voltage at a first input terminal, input the reference voltage at a second input terminal, and output an amplified voltage to the A/D conversion circuit;

a fixed resistor connected between an output terminal of the correction circuit and the second input terminal of the operational amplifier; and a variable resistor connected between the output terminal and the second input terminal of the operational amplifier, wherein a temperature coefficient of the output voltage of the subtraction amplifier can be corrected by changing a resistance of the variable resistor.

11. The temperature detection circuit according to claim 9, wherein the correction circuit subtracts the predetermined value from the A/D conversion signal output from the A/D conversion circuit.

12. The temperature detection circuit according to claim 11, wherein the correction circuit includes:

a setting circuit configured to set a subtraction value to be subtracted; and a subtraction circuit configured to subtract the subtraction value set in the setting circuit from the A/D conversion signal output form the A/D conversion circuit.

* * * * *